United States Patent
Siew et al.

(10) Patent No.: US 10,084,574 B2
(45) Date of Patent: Sep. 25, 2018

(54) MULTIPLE COMPONENT CARRIER OFDMA COMMUNICATION SYSTEM

(75) Inventors: Jiun Siew, Victoria (AU); Phong Nguyen, Victoria (AU); Boon Loong Ng, Victoria (AU)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 935 days.

(21) Appl. No.: 13/143,279

(22) PCT Filed: Jan. 12, 2010

(86) PCT No.: PCT/JP2010/050458
§ 371 (c)(1),
(2), (4) Date: Jul. 5, 2011

(87) PCT Pub. No.: WO2010/079849
PCT Pub. Date: Jul. 15, 2010

(65) Prior Publication Data
US 2011/0268071 A1 Nov. 3, 2011

(30) Foreign Application Priority Data
Jan. 9, 2009 (AU) ................................. 2009900066

(51) Int. Cl.
*H04L 5/00* (2006.01)
*H04L 1/00* (2006.01)

(52) U.S. Cl.
CPC .......... *H04L 5/0007* (2013.01); *H04L 1/0003* (2013.01); *H04L 5/003* (2013.01); *H04L 5/0037* (2013.01); *H04L 5/0064* (2013.01); *H04L 1/0013* (2013.01)

(58) Field of Classification Search
CPC .... H04L 1/0003; H04L 1/0013; H04L 5/0007; H04L 5/003; H04L 5/0037; H04L 5/0064
USPC .......................................................... 370/329
See application file for complete search history.

(56) References Cited

U.S. PATENT DOCUMENTS

| | | | |
|---|---|---|---|
| 2005/0286409 A1 | 12/2005 | Yoon et al. | |
| 2008/0268785 A1* | 10/2008 | McCoy et al. | 455/67.11 |
| 2009/0175243 A1* | 7/2009 | Han et al. | 370/335 |

FOREIGN PATENT DOCUMENTS

| | | |
|---|---|---|
| CN | 1703863 A | 11/2005 |
| CN | 1973507 A | 5/2007 |

OTHER PUBLICATIONS

Dahlman, Erik, et. al. "3G Evolution, 2nd Edition" Academic Press. Oct. 2, 2008.*
"3GPP TSG RAN WG1 Meeting #55" NTT Docomo, Inc. Nov. 10-14, 2008.*
Ericsson, Carrier Aggregation in LTE-Advanced, TSG-RAN WG1 #53bis, R1-082468, Jul. 2008, 6 pages.

(Continued)

*Primary Examiner* — Stephen J Clawson
(74) *Attorney, Agent, or Firm* — Kunzler, PC

(57) ABSTRACT

A method of enhancing a downlink channel coding structure in an OFDMA (orthogonal frequency division multiple access) communication system is provided. The method includes: segmenting a concatenation of multiple transport blocks amongst multiple component carriers; and separately performing link adaptation for each component carrier according to channel conditions experienced by that component carrier.

12 Claims, 7 Drawing Sheets

(56) References Cited

OTHER PUBLICATIONS

NTT Docomo, Inc., Transport Block Mapping for Wider Bandwidth in LTE-Advanced, 3GPP TSG RAN WG1 Meeting #55, R1-084245, Nov. 2008, 7 pages.
Office Action dated Mar. 3, 2014 in related Chinese application No. 201080004315.3 with English-language translation (18 pgs.).

* cited by examiner

MULTIPLE COMPONENT CARRIER OFDMA COMMUNICATION SYSTEM

This application is the National Phase of PCT/JP2010/050458, filed Jan. 12, 2010, and claims the benefit of priority from Australian provisional patent application No. 2009900066, filed on Jan. 9, 2009, the disclosures of which are incorporated herein by reference in their entirety.

TECHNICAL FIELD

The present invention relates generally to wireless communication systems and in particular to multiple component carrier OFDMA (Orthogonal Frequency Division Multiple Access) communication systems. The present invention is particularly suitable for use in the telecommunications standard currently being developed by the Third Generation Partnership Project (3GPP) known as Long Term Evolution (LTE) Advanced, and it will be convenient to describe the invention in relation to that exemplary, but non-limiting, application.

BACKGROUND OF INVENTION

Advanced evolution mobile broadband communication systems, such as those being developed to conform to the 3GPP LTE-Advanced and IEEE 802.16m communications standards, require scalable bandwidth from 5 MHz to 100 MHz. In other words, channel bandwidths will be required which are well beyond the 20 MHz bandwidth currently standardized for LTE. LTE-Advanced is also required to be backwards compatible to LTE, primarily focused on low-mobility users in order to reach ITU-Advanced's requirement on data rates, further increase voice over IP (Internet Protocol) capacity, further improves cell edge data rates and improve self configuration of the communications network. It is necessary to develop a scheme for mapping a MAC (media access control) layer to a physical layer.

One proposed MAC-to-physical layer mapping scheme currently being considered by the 3GPP for inclusion in the LTE-Advanced standards consists of multiple identical signal processing chains. In each chain, a transport block is channel coded, rate matched, scrambled, modulated and precoded. The precoded symbols corresponding to each transport block are then mapped to resource element (RE) in the allocated resource blocks (RB) of a particular component carrier. However, even though a number of different component carriers are used to transmit transport block data, no improvement in frequency diversity over current LTE standards is achieved since data from each transport block is transmitted on one component carrier only.

In order to achieve such a frequency diversity improvement, another MAC-to-physical layer mapping scheme has been proposed. In this scheme, resource blocks associated with each coded, rate matched and modulated transport block are distributed amongst a number of available component carriers. However, the link adaptation capability of this scheme is relatively poor because only one type of modulation scheme can be applied for each transport block for each Transmission Time Interval (TTI) regardless of which component carrier the symbols from each transport block were mapped to.

SUMMARY OF THE INVENTION

There exists a need to ameliorate or overcome one or more of the above-described deficiencies of communication systems defined by existing LTE-Advanced standards.

There also exists a need to provide an OFDMA communication system which maximizes time, path, frequency and/or antennae diversity, improves the robustness of communications between entities forming part of an OFDMA communications network, while maximizing the data carrying capabilities of the increased bandwidth provided in such systems.

With this in mind, one exemplary aspect of the invention provides a method of enhancing a downlink channel coding structure in an OFDMA (orthogonal frequency division multiple access) communication system, the method including: segmenting a concatenation of multiple transport blocks amongst multiple component carriers; and separately performing link adaptation for each component carrier according to channel conditions experienced by that component carrier.

Such a method overcomes the shortcomings of known LTE MAC-to-physical layer mapping schemes by providing improved frequency diversity gain whilst at the same time maintaining link adaptation capability for each component carrier.

Another exemplary aspect of the invention provided a method of enhancing resource block mapping in an OFDMA communication system in which data is transmitted on multiple component carriers, the method including: processing transport blocks in each of a plurality of signal processing chains; and mapping resource blocks associated with a particular transport block to different component carriers according to a predetermined mapping pattern between transport blocks and component carriers.

Such a method also achieves an improvement in frequency diversity gain over existing LTE MAC-to-physical layer mapping schemes.

The above and other objects, features, and advantages of the present invention will become apparent from the following description based on the accompanying drawings which illustrate exemplary embodiments of the present invention.

DETAILED DESCRIPTION OF THE EXEMPLARY EMBODIMENTS

The accompanying drawings, which are included to provide a further understanding of the invention and are incorporated in and constitute part of this specification, illustrate exemplary embodiments of the invention that together with the description serve to explain the principles of the invention in an exemplary, but non-limiting, manner.

Figure 1:
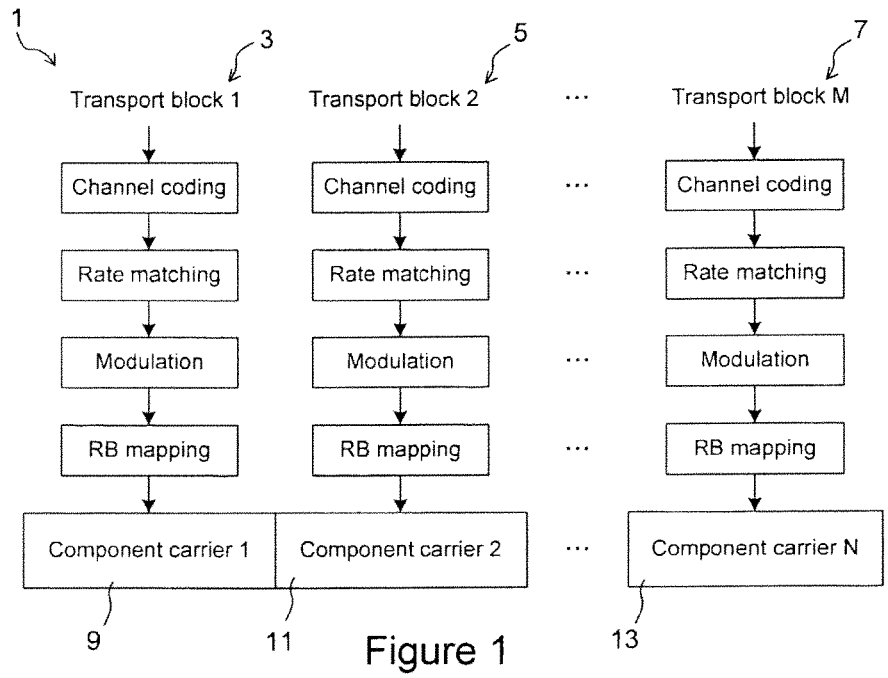
FIG. 1 is a flow-chart of an existing LTE MAC-to-physical layer mapping scheme.

Referring now to FIG. 1, there is shown a first proposed MAC-to-physical layer mapping scheme 1 including multiple identical signal processing chains 3, 5 and 7. In each chain, a transport block is channel coded, rate matched, scrambled, modulated and precoded. The precoded symbol corresponding to each transport block are then mapped to RE in the allocated resource blocks (RB) of a separate component carrier 9, 11 and 13. It will be appreciated that even though a number of different component carriers are used to transmit transport block data, no improvement in frequency diversity over current LTE standards is achieved since data from each transport block is transmitted on one component carrier only.

Figure 2:
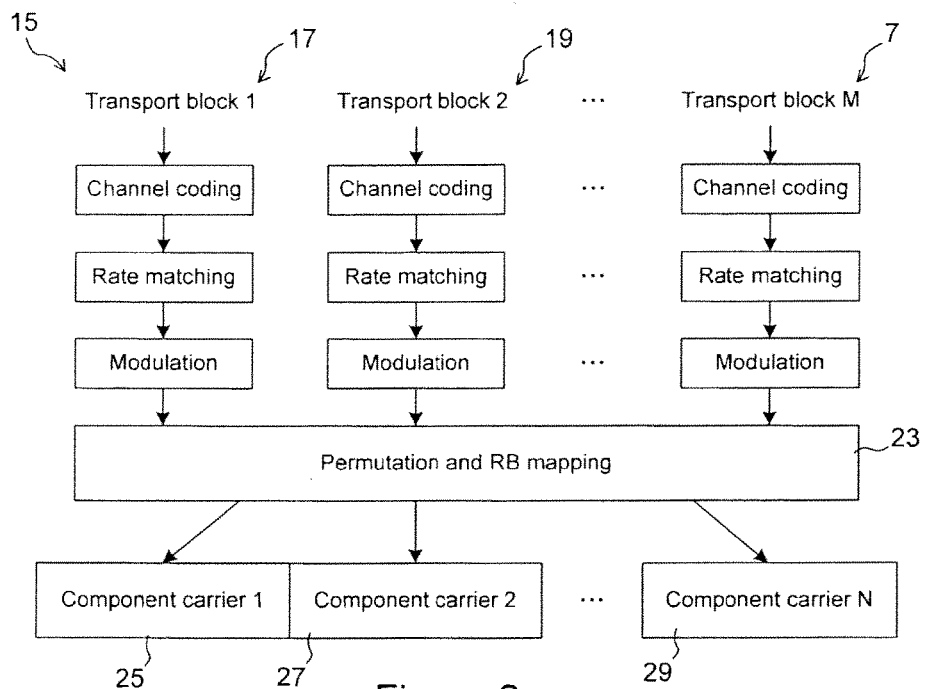
FIG. 2 is a flow-chart of another existing LTE MAC-to-physical layer mapping scheme.

FIG. 2 shows another proposed MAC-to-physical layer mapping scheme 15 including multiple signal processing chains 17, 19 and 21. Although a number of processing operations performed in each signal processing chain are identical to that depicted in FIG. 1, the MAC-to-physical layer mapping scheme 15 includes a resource block mapping function 23 in which resource blocks associated with each coded, rate matched and modulated transport block are distributed amongst a number of component carriers 25, 27 and 29. However, the link adaptation capability of this scheme is relatively poor because only one type of modulation scheme can be applied for each transport block for each Transmission Time Interval (TTI) regardless of which component carrier the symbols from each transport block were mapped to.

Figure 3:
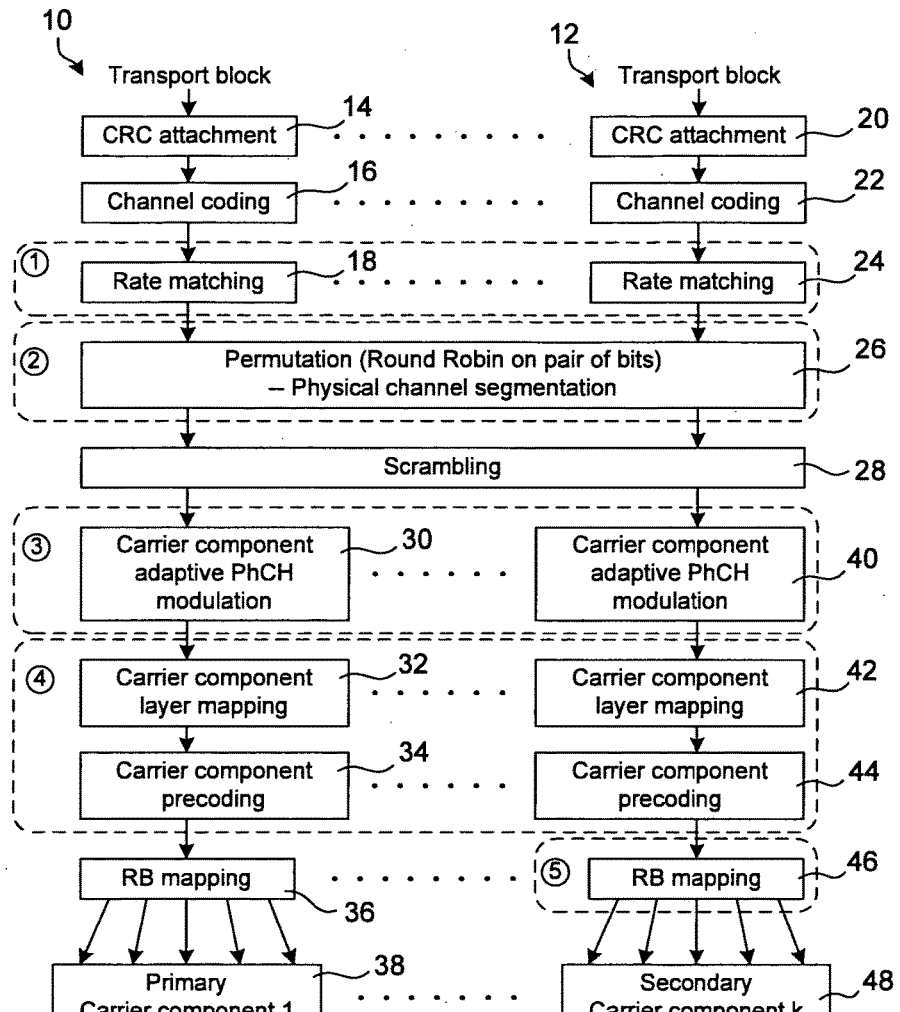
FIG. 3 is a flow-chart depicting a number of operations performed in a MAC-to-physical layer mapping scheme used as part of a wireless communications system according to one exemplary embodiment of the present invention.

FIG. 3 depicts a MAC-to-physical layer mapping scheme according to one exemplary embodiment of the present invention which addresses deficiencies in the schemes shown in FIGS. 1 and 2. Initially, data is sent to the physical layer from the MAC layer using transport blocks, representative ones of which are referenced 10 and 12 in FIG. 3. Considering transport block 10 alone for the moment, initially a cyclic redundancy check (CRC) code is attached to the transport block 10 at step 14. Error correction coding, known as channel coding, is then added to the transport block at steps 16 in order to add redundancy to the transmitted bit stream for use in forward error correction.

The number of bits on a transport channel can vary with every transmission time interval. However, the physical channel radio frames must be completely filled. Accordingly, bits are either deleted from the transport block by "puncturing" or alternatively bits can be repeated in order to adjust the rate at which bits are transmitted on the transport channel with the physical channel radio frame transmission rate at step 18. This procedure is referred to as "rate matching."

Similar operations to those carried out at steps 14, 16 and 18 are carried out in relation to transport block 12 at steps 20, 22 and 24. It will be appreciated that transport blocks 10 and 12 are illustrative only and that, in practice, multiple transport blocks will be processed in parallel.

Figure 4:
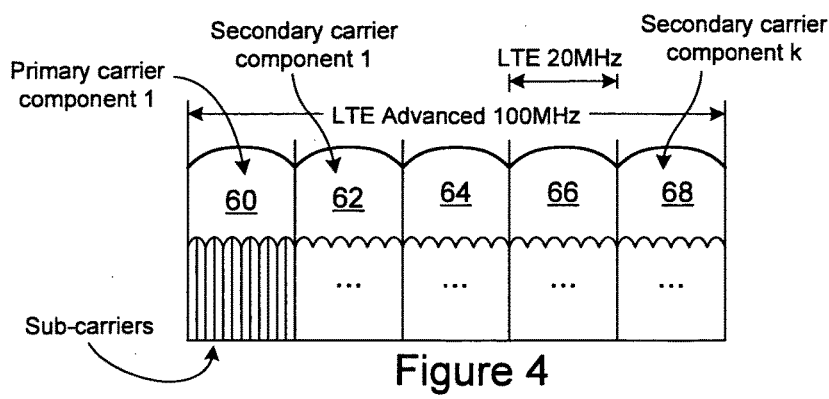
FIG. 4 is a graphical depiction of a series of component carriers and their respective sub-carriers used in the transmission of data between networked entities.

The processed transport block data from the various transport blocks (such as transport blocks 10 and 12 and others which may be processed in parallel) are intended to be modulated by multiple component carriers. As shown in FIG. 4, while current LTE communication standards define a system bandwidth of 20 MHz, the proposed LTE-Advanced communication standard defines an aggregated system bandwidth of up to 100 MHz. One convenient manner in which this system bandwidth can be achieved is to provide a primary component carrier 60 and associated sub-carriers conforming to LTE communication standards, and to repeat this structure across the entire system bandwidth at a number of secondary component carriers 62 to 68.

At step 26, a concatenation of multiple channel-coded and rate-matched transport blocks, either from a single transport channel or from multiple transport channels, are segmented into physical channels to be mapped among the various component carriers represented by components 60 to 68. In order to further improve frequency diversity, transport block data may be permutated within and/or among the multiple transport blocks prior to physical channel segmentation of the concatenation of multiple transport blocks among the multiple component carriers. At step 28, scrambling codes are added to the segmented physical channel.

Performing physical channel segmentation of the multiple transport blocks amongst multiple component carriers at this stage in the signal processing chains advantageously improves frequency diversity over existing LTE systems, whilst enabling link adaptation to be separately performed for each component carrier according to channel conditions experienced by that component carrier. Link adaptation may include adapting any one or more of a modulation scheme, a number of transmit streams (rank), precoding and transmission scheme for each component carrier.

Accordingly, at step 30, the physical channel (PhCH) intended to be modulated by the primary component carrier 60 has applied thereto a modulation scheme (such as QPSK (quadrature phase shift keying), 16-QAM (quadrature amplitude modulation) or 64-QAM) which is adapted according to channel conditions experienced by that component carrier. In existing LTE-A (LTE-Advanced) proposed systems, modulation mapping is performed before permutation/resource block mapping so that flexibility in choice of modulation scheme on a component carrier basis is unable to be achieved.

Component carrier layer mapping is then carried out at step 32 on the physical channel intended to be transmitted on primary component carrier 60 so as to adapt the number of transmit streams (rank) and transmission scheme for each component carrier according to channel conditions experienced by that component carrier.

Component carrier pre-coding is carried out at step 34 on the modulated physical channel intended to be transmitted on primary component carrier 60 so as to adapt the precoding for each component carrier according to channel conditions experienced by that component carrier.

At step 36, the precoded physical channel is then mapped into a resource block (RB) defining symbols and sub-carriers within the primary component carrier 60 for transmission over the air interface by the primary component carrier and its associated sub-carriers at step 38.

Similarly, for a physical channel intended to be transmitted via secondary component carrier 68 and its associated sub-carriers, component carrier level channel modulation is carried out at step 40, followed by component carrier layer mapping at step 42 and component carrier pre-coding at step 44, resource block mapping is carried out at step 46 to enable the physical channel to be transmitted by the secondary component carrier 68 and its associated sub-carriers at step 48. It is to be understood that the operations carried out steps 40 to 48 are substantially identical to the operations described in relation to steps 30 to 38.

Figure 5:
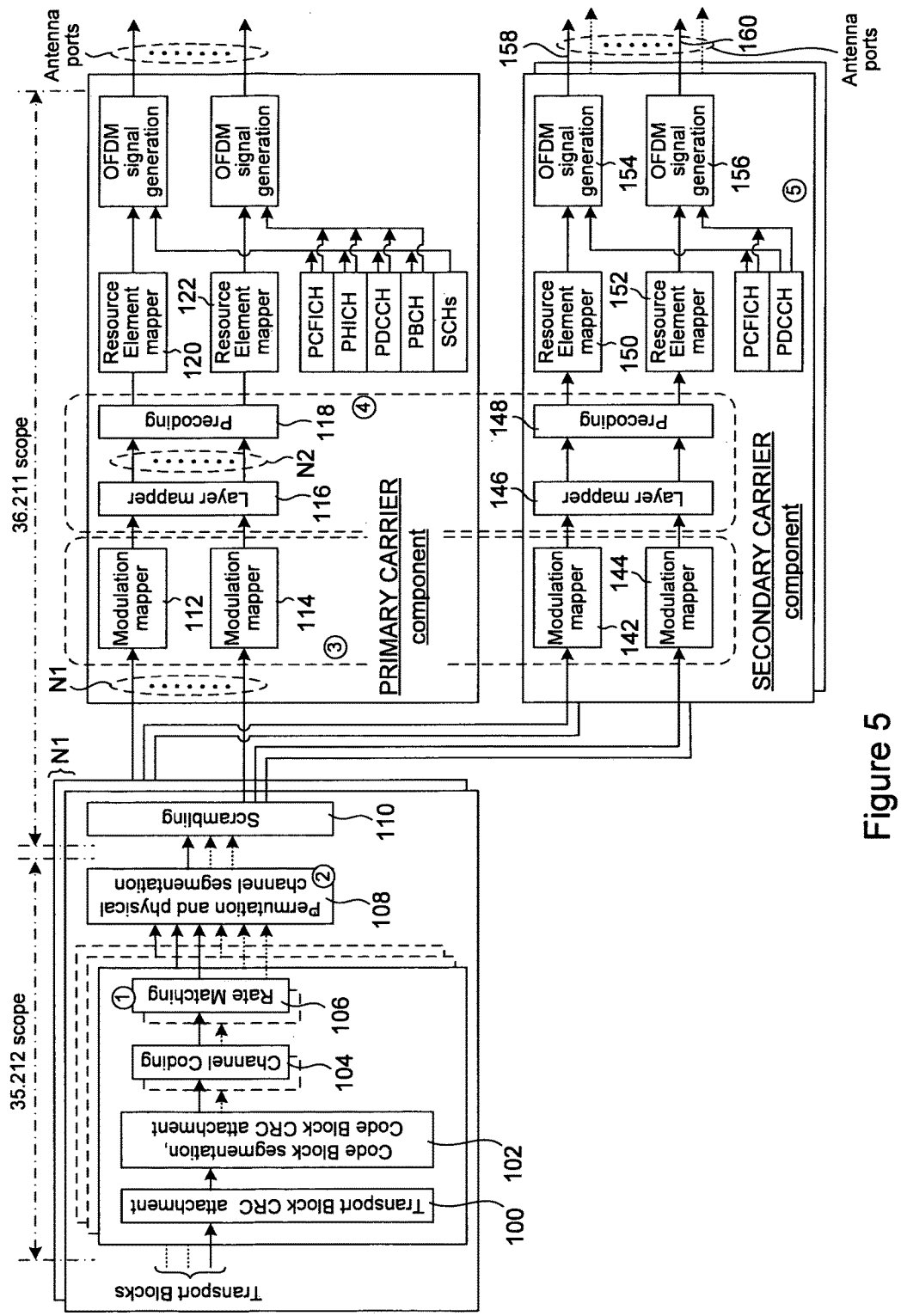
FIG. 5 is a schematic diagram depicting channel coding structure operation performed by a base station transmitter forming part of a mobile communication system.

FIG. 5 depicts a detailed channel coding structure in more detail in relation to those operations performed at a base station transmitter. The depicted base station transmitter has a configuration in which permutation and physical channel segmentation block 108 and secondary carrier component blocks are added to an existing LTE base station transmitter. Rate matching block 106 is modified to handle more robust link adaptation at code block level by considering retransmission at retransmission at code block level.

The operations performed by a transport block CRC attachment block 100, code block segmentation and CRC attachment (at code block level) block 102, channel coding block 104, rate matching block 106, permutation and physical channel segmentation block 108 and scrambling block 110 respectively correspond to the operations performed at steps 14, 16, 18, 24, 26 and 28 depicted in FIG. 3. Similarly, a series of modulation mappers, two examples of which are referenced 112 and 114, are provided in each base station transmitter to carry out step 30 for each of the sub-carriers of the primary component carrier 60. Reference N1 indicates the number of codewords, which is up to two for legacy LTE and up to four for LTE-A. The number of codewords can be independently set for each carrier component.

A layer mapper 116 and pre-coding module 118 are provided to carry out steps 32 and 34 in relation to the primary component carrier. Reference N2 indicates the number of layers which is up to four for legacy LTE and up to eight for LTE-A.

Resource element mappers, such as those referenced 120 and 122 are provided in order to carry out step 36, namely mapping the code blocks at the output of the pre-coding block 118 to resource elements within the resource blocks for transmission to a base band UE receiver.

Corresponding functionality is provided by the base station transmitter in relation to the various secondary component carriers. For each such component carrier, modulation mappers 142 and 144, layer mapper 146, pre-coding block 148, resource element mappers 150 and 152 and OFDM signal generation blocks 154 and 156 are provided to transmit OFDM signal from antennae ports 158 and 160. Comparing with the primary carrier component block, the second carrier component block lacks PHICH, PBCH and SCH functions. This feature enables increase in channel capacity for the data channel.

In the base station transmitter depicted in FIG. 5, different segmentation physical channels can have different modulation scheme and transmission scheme in order to utilize the difference channel condition on difference carriers. The enhanced function of the present exemplary embodiment allows improvement on link adaptation and adaptive antenna improvement. The enhancement shall be invisible for a legacy LTE UE, and therefore there is no impact on the legacy LTE UE which operates within the LTE-A base station.

Figure 6:
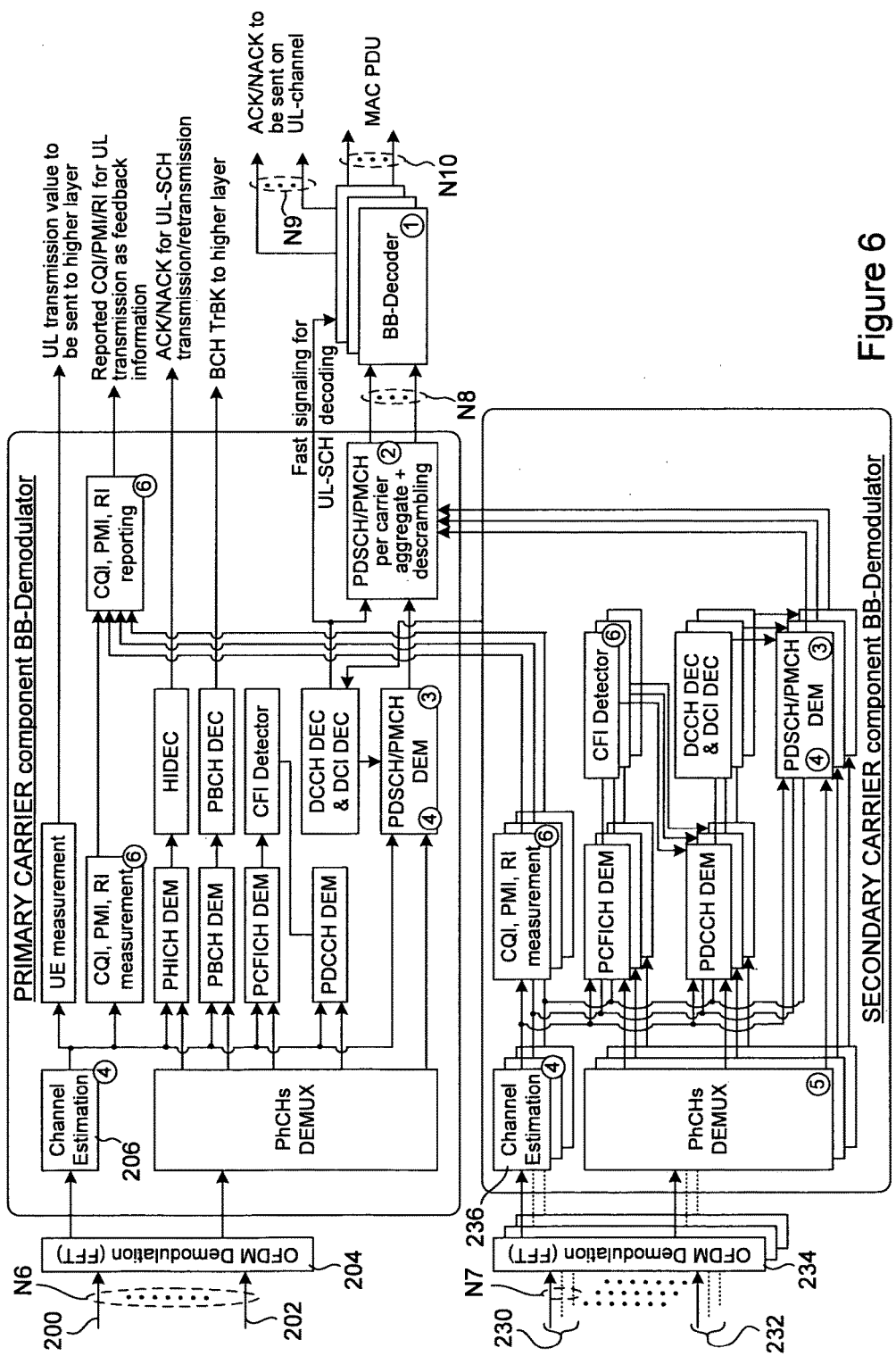
FIG. 6 is a schematic diagram depicting channel coding structure operation performed by a UE (user equipment) receiver forming part of a mobile communication system.

FIG. 6 depicts a detailed channel decoding structure carried out at a base band UE receiver in relation to data transmitted by the base station transmitter as shown in FIG. 5. The depicted base band UE receiver has a configuration in which a block for secondary carrier component baseband (BB) demodulation having additional processing function to support secondary carries introduced by aggregation bandwidth concept is added to an existing LTE base band receiver. Accordingly, for the primary component carrier 60, the base band UE receiver receives a transmitted signal from the base station transmitter at virtual antennae ports 200 and 202. A Fast Fourier Transform is performed by OFDM demodulation block 204 in order to transform the digitized time domain signals into frequency domain representations for further processing. Reference N6 indicates the number of inputs to OFDM demodulation block 204 which equals to the number of the receiver (RX) antennae.

Following OFDM demodulation by block 204, channel estimation block 206 acts to perform channel estimation based on the demodulated reference OFDM symbols received from the base station transmitter. This result of channel estimation information shall be then used for estimating channel state information (CSI) and Channel Quality Information which is transmitted back to the base station transmitter in the form of CQI (Channel quality index), RI (Rank indicator) and PMI (Precoding Matrix Index) for use in link adaptation for each component carrier according to channel conditions experienced by that component carrier.

Similarly, for each of the secondary component carriers, the base band UE receiver includes two virtual antennae ports 230 and 232 connected to an OFDM demodulation block 234 for applying an FFT transform to the time based input signals and recovery a frequency domain representation thereof. A channel estimation block 236 are connected to the output of the OFDM demodulation 234. Reference N7 indicates the total number of virtual antennae ports 230, which is equal to the number of second carriers.

In the first carrier component baseband demodulation block of the UE receiver, the block of DCCH DEC and DCI DEC has legacy LTE processing function with enhancement to support additional fast signaling for the LTE-A UE, the block of PDSCH/PMCH DEM has legacy LTE processing function with enhancement to support additional layers introduced for LTE-A, and the block of CQI, PMI and RI reporting has legacy LTE function with enhancement to cover CQI/PMI/RI measurement obtained on the aggregated bandwidth. If the block of PDSCH/PMCH per carrier aggregate plus descrambling operates in the legacy LTE base station, the function of this block shall be transparent because there is only one PDSCH per codeword or PMCH. Reference N8 indicates the number of outputs of the block of PDSCH/PMCH per carrier aggregate plus descrambling, which is equal to the number of the codewords.

The baseband (BB) decoder has legacy LTE processing functions and is scalable at module level to support additional codewords and secondary carriers introduced by LTE Advanced. The baseband decoder outputs ACK/NACK, which is to be sent on UL-channel as feedback information, and MAC PDU. Reference N9 indicates the number of inputs of ACK/NACK, which is equal to the number of the codewords, and reference N10 indicates the number of inputs of MAC PDU, which is equal to the number of the codewords.

Figure 7:
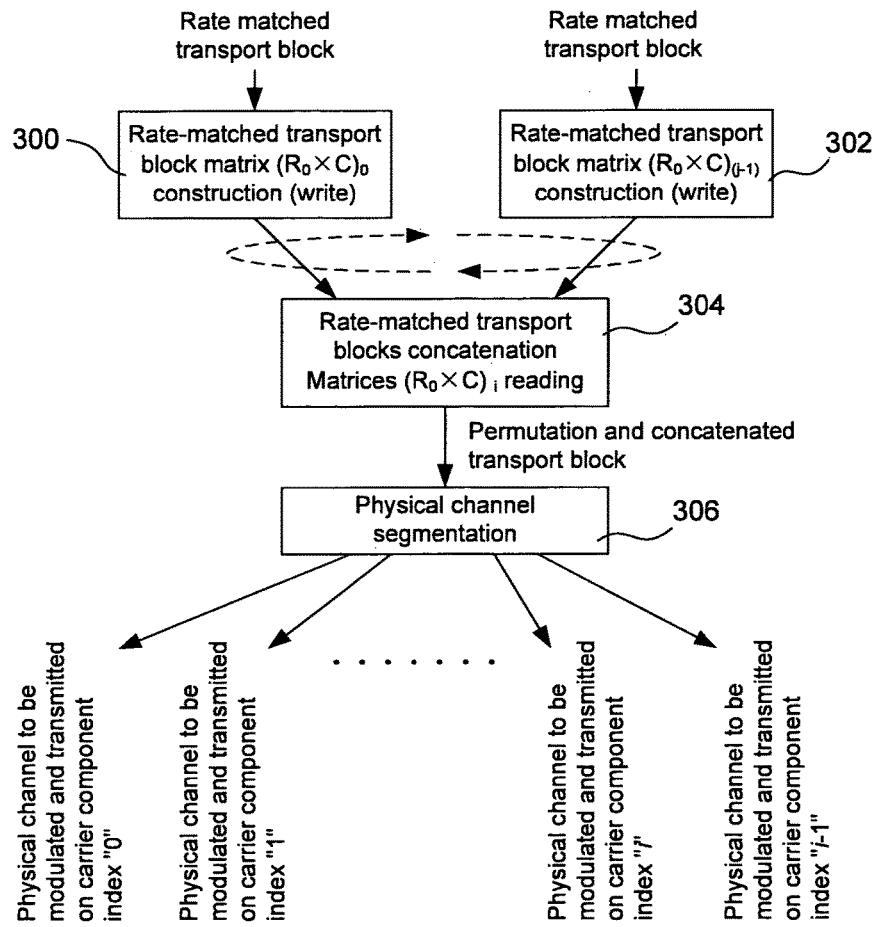
FIG. 7 is a flow-chart depicting a series of operations performed during a permutation and physical channel segmentation process carried out by networked entities forming part of a mobile communication system.

In the present exemplary embodiment, module 108 from the base station transmitter is notably involved in the permutation of transport channel code blocks within and among the multiple transport blocks and the segmentation of a permutated concatenation of multiple transport block among multiple component carriers. Accordingly, the module 108 acts to distribute group of bits forming a modulated symbol in each code block into different sub-carriers of different component carriers in order to achieve a gain in frequency diversity of wider band width than is currently possible. A modulated symbol to be mapped to a resource element of a component carrier therefore consists of bits coming from the same code block. FIG. 7 depicts one way in which this is achieved. This process consists of the following stages:

a. At steps 300 and 302, construct $R_j \times C$ matrix for each rate matched transport block j
Where:

$$C = \sum_{i=0}^{CComp-1} k_i,$$

with:
CComp is number of component carriers used for data transmission,
$k_i$ is the number of column of component carrier index i and
$k_i=2$ for QPSK modulation,
$k_i=4$ for 16-QAM modulation, and
$k_i=6$ for 64-QAM modulation, $$R_j = \left\lceil \frac{F_j}{C} \right\rceil$$

with $F_j$ is the size of a rate matched transport block j, b. For each rate-matched transport block j, fill its own matrix $R_j \times C$ ROW-by-ROW,
c. Perform the matrices permutation per predefined permutation pattern,
d. Once all matrices $R_j \times C$ has been filled and permuted, the data read out from all $R_j \times C$ matrices according to the following algorithm,

```
Let: Row = max[R_j] & J be number of rate-matched transport block
    r = 0;
    for r < Row
        i = 0;
        for i < J
            - Read entire row r of the matrix (R × C)_i at step 304 to
              form concatenated rate-matched transport block F ,
            - empty row or matrix element shall be ignored,
            - i = i + 1;
        End for loop;
        r = r + 1;
    End for loop;
``` e. The concatenated rate-matched transport block shall be segmented at step 306 to form physical channel which is modulated and transmitted on each component carrier.

Figure 8:
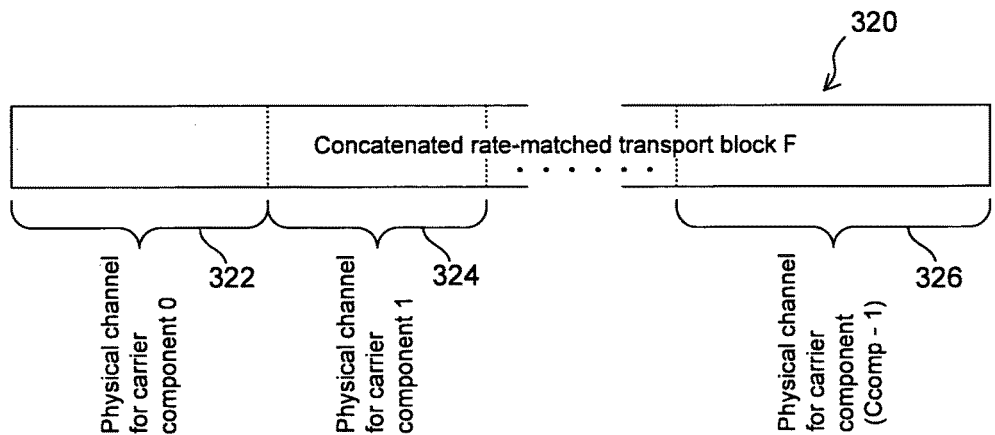
FIG. 8 is a graphical depiction of the physical channel segmentation resulting from the series of steps depicted in FIG. 5.

FIG. 8 depicts the resulting segmentation of an exemplary concatenated rate matched transport block 320 among multiple component carrier 322 to 326. It will be appreciated that baseband UE receiver performs inverse operations to that performed by module 108 in order to recover the data transmitted from the base station transmitter.

To enable exploitation of frequency diversity for multiple component carrier OFDMA systems, resource block mapping operations depend on the type of resource allocation schemes and channel conditions. Resource allocation can be generally classified into two types, namely frequency selective resource allocation or non-frequency selective resource allocation. The latter type of resource allocation is used when there is no reliable channel quality information available. In this case, frequency diversity gain can be achieved by allocating resource blocks to the UE in a distributed manner by allocating discontinuous resource blocks in frequency covering a wide portion of the band width.

Figure 9:
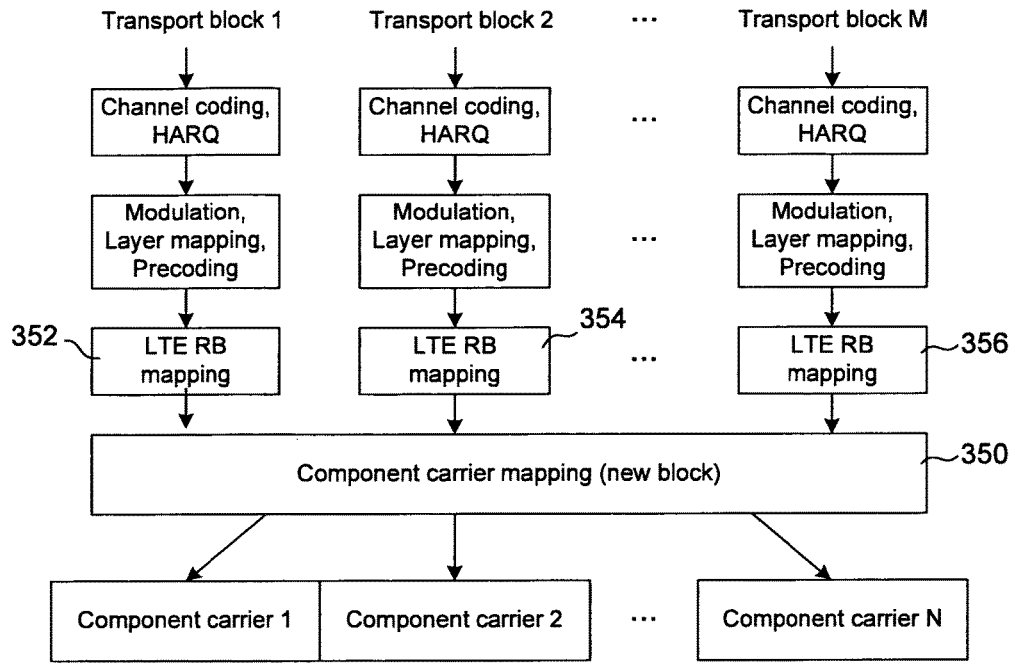
FIG. 9 is a flow-chart depicting operations performed in the physical layer by networked entities forming part of a wireless communication system and notably depicting a component carrier hopping function to exploit frequency diversity.
Figure 10:
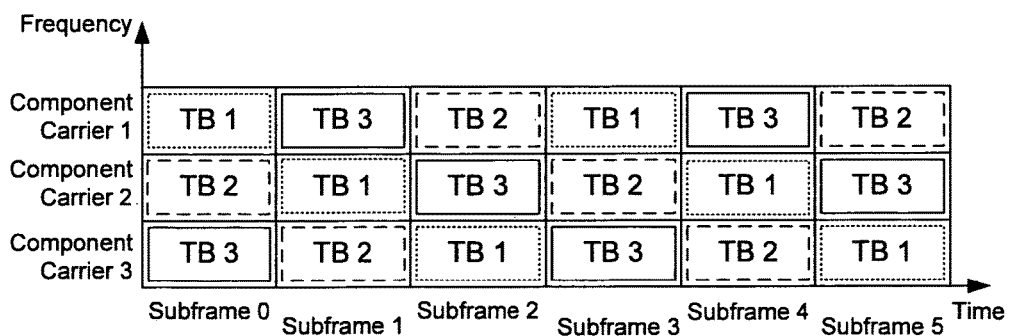
FIG. 10 is a graphical depiction of an embodiment of component carrier hopping functions.
Figure 11:
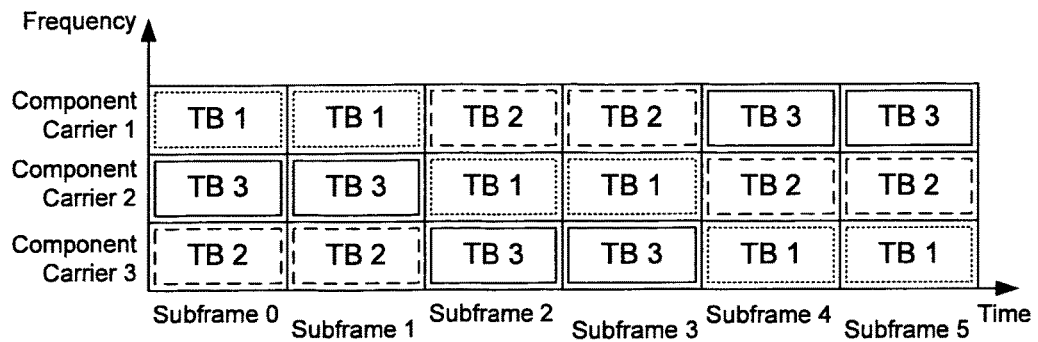
FIG. 11 is a graphical depiction of another embodiment of component carrier hopping functions.
Figure 12:
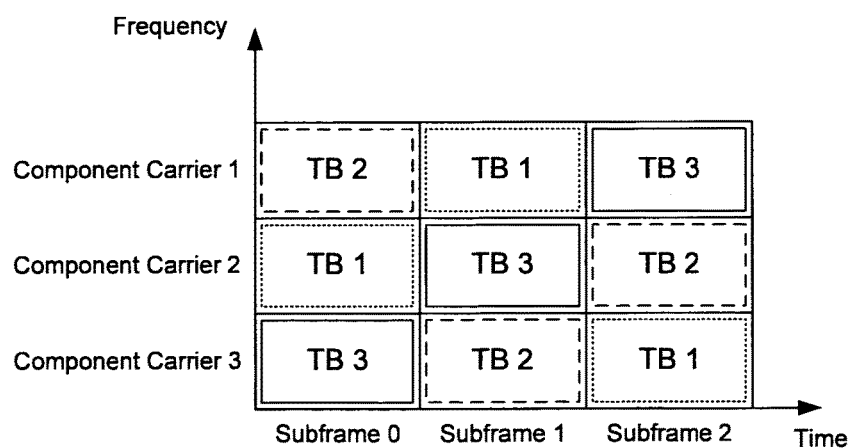
FIG. 12 is a graphical depiction of a further embodiment of component carrier hopping functions.

As depicted in FIG. 9, non-frequency selective resource allocation is achieved in the present exemplary embodiment by re-using legacy resource allocation formats to indicate the resources assigned for a particular active component carrier. In addition, in order to harness additional frequency diversity gain, resource blocks associated with the transport block are able to "hop" among component carriers in a predetermined pattern in time. Hopping patterns for difference transport blocks may be unique and collision may be avoided so that no two transport blocks are allocated to the same component carrier at the same time. Accordingly, resource blocks associated with the particular transport block are allocated to different component carriers according to a predetermined mapping pattern between transport blocks and component carriers. The predetermined mapping pattern may define (1) a cyclic hopping of transport blocks between the multiple component carriers, or alternatively (2) a pseudo-random hopping of transport blocks between the multiple component carriers. FIGS. 10 to 12 are graphical depictions of three different embodiments of component carrier hopping functions.

These two types of hopping patterns are explained below:
(1) Cyclic hopping—assuming hopping occurs every sub-frame and that transport block m is mapped to component carrier n in sub-frame k, then transport block m shall be mapped to component carrier (n+1 mod N) in sub-frame k+1 at step 350 in FIG. 9 and following resource block mapping at steps 352 to 356. For 'slower' hopping rate, the transport block to component carrier mapping changes once every few sub-frames. Illustration of fast and slow cyclic hopping for three transport blocks TB1 to TB3 and three component carriers is shown in FIG. 10 and FIG. 11, respectively.

(2) Random hopping—this method can be implemented by having a pseudo-random number generator known to both the base station (BS) and the UE and synchronized. A method that does not require the pseudo-random number generator is to define hopping table known at the BS and the UE. Illustration of the random hopping pattern is shown in FIG. 12. In this example, the pseudo-random number generator produces a sequence 2, 1, 3, which implies that transport block TB1 is mapped to component carrier 2 in sub-frame 0, to component carrier 1 in sub-frame 1 and to component carrier in sub-frame 2. To ensure orthogonality, the mapping of transport blocks TB2 and TB3 are different cyclic shifted versions of the mapping of transport block TB1. In FIG. 12, transport block TB2 is −1 shifted, so it is mapped to component carrier 1, 3, 2, for sub-frame 0, 1, 2, respectively, whereas transport block TB3 is +1 shifted, so it is mapped to component carrier 3, 2, 1 for sub-frame 0, 1, 2, respectively.

There are further exemplary embodiments of the present invention as follows.

Further Exemplary Embodiment 1

An OFDMA communication system in which a downlink channel coding structure is enhanced, the system comprising:

means for segmenting a concatenation of permutated multiple transport blocks amongst multiple component carriers; and means for separately performing link adaptation for each component carrier according to channel conditions experienced by that component carrier.

Further Exemplary Embodiment 2

The system according to Further Exemplary Embodiment 1, wherein the performing means includes means for adapting a modulation scheme for each component carrier.

Further Exemplary Embodiment 3

The system according to Further Exemplary Embodiment 1 or 2, wherein the performing means includes means for adapting a number of transmit streams (rank) for each component carrier.

Further Exemplary Embodiment 4

The system according to any one of Further Exemplary Embodiments 1 to 3, wherein the performing means includes means for adapting precoding for each component carrier.

Further Exemplary Embodiment 5

The system according to any one of Further Exemplary Embodiments 1 to 3, wherein the performing means includes means for adapting a transmission scheme for each component carrier.

Further Exemplary Embodiment 6

An OFDMA communication system in which data is transmitted on multiple component carriers and resource block mapping is enhanced, the system comprising:

means for processing transport blocks in each of a plurality of signal processing chains; and means for mapping resource blocks associated with a particular transport block to different component carriers according to a predetermined mapping pattern between transport blocks and component carriers.

Further Exemplary Embodiment 7

The system according to Further Exemplary Embodiment 6, wherein the predetermined mapping pattern defines cyclic hopping of transport blocks between the multiple component carriers.

Further Exemplary Embodiment 8

The system according to Further Exemplary Embodiment 6, wherein the predetermined mapping pattern defines pseudo-random hopping of transport blocks between the multiple component carriers.

In various embodiments of the invention, the step of performing link adaptation may include adapting any one or more of a modulation scheme, a number of transmit streams (rank), precoding and transmission scheme for each component carrier.

In one or more embodiments of the invention, the predetermined mapping pattern defines cyclic hopping of transport blocks between the multiple component carriers.

In other embodiments of the invention, the predetermined mapping pattern defines pseudo-random hopping of transport blocks between the multiple component carriers.

It will be apparent that other variations and modifications may be made to the above described embodiments and functionality, with the attainment of some or all of their advantages. It is an object of the appended claims to cover all such variations and modifications as come within the true spirit and scope of the invention.

The invention claimed is:

1. A method of downlink channel coding, implemented in a base station used in an OFDMA, orthogonal frequency division multiple access, communication system, the method comprising:

performing rate-matching on each of multiple transport blocks;

permutating a concatenation of the rate-matched multiple transport blocks;

segmenting the permutated concatenation of rate-matched multiple transport blocks into multiple physical channels to be mapped on multiple component carriers such that each of the rate-matched multiple transport blocks is distributed amongst the multiple physical channels for each transmission time interval; and performing link adaptation for each component carrier according to a channel condition experienced by said each component carrier.

2. The method according to claim 1, wherein the link adaptation includes:

adapting a modulation scheme for said each component carrier.

3. The method according to claim 2, wherein the link adaptation includes:

adapting the number of transmit streams for said each component carrier.

4. The method according to claim 3, wherein the link adaptation includes:

adapting precoding for said each component carrier.

5. The method according to claim 2, wherein the link adaptation includes:

adapting precoding for said each component carrier.

6. The method according to claim 1, wherein the link adaptation includes:

adapting the number of transmit streams for said each component carrier.

7. The method according to claim 6, wherein the link adaptation includes:

adapting precoding for said each component carrier.

8. The method according to claim 1, wherein the link adaptation includes:

adapting precoding for said each component carrier.

9. The method according to claim 1, wherein the link adaptation includes:

adapting a transmission scheme for said each component carrier.

10. The method according to claim 9, wherein the link adaptation includes:

adapting modulation scheme for said each component carrier.

11. The method according to claim 9, wherein the link adaptation includes:
  adapting the number of transmit streams for said each component carrier.

12. The method according to claim 9, wherein the link adaptation includes:
  adapting precoding for said each component carrier.

* * * * *